United States Patent
Golko et al.

(10) Patent No.: US 9,634,378 B2
(45) Date of Patent: *Apr. 25, 2017

(54) PERIPHERAL ELECTRONIC DEVICE HOUSING MEMBERS WITH GAPS AND DIELECTRIC COATINGS

(71) Applicant: Apple Inc., Cupertino, CA (US)

(72) Inventors: Albert J. Golko, Saratoga, CA (US); Daniel W. Jarvis, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 159 days.

This patent is subject to a terminal disclaimer.

(21) Appl. No.: 14/612,217

(22) Filed: Feb. 2, 2015

(65) Prior Publication Data

US 2015/0214600 A1  Jul. 30, 2015

Related U.S. Application Data

(63) Continuation of application No. 12/973,586, filed on Dec. 20, 2010, now Pat. No. 8,947,303.

(51) Int. Cl.
*H01Q 1/24* (2006.01)
*G06F 1/16* (2006.01)
(Continued)

(52) U.S. Cl.
CPC .......... *H01Q 1/241* (2013.01); *G06F 1/1698* (2013.01); *H01Q 1/2266* (2013.01); *H01Q 1/243* (2013.01);
(Continued)

(58) Field of Classification Search
CPC .................................. H01Q 1/243; H01Q 1/242
(Continued)

(56) References Cited

U.S. PATENT DOCUMENTS 2,942,263 A  6/1960  Baldwin
3,394,373 A  7/1968  Makrancy
(Continued)

FOREIGN PATENT DOCUMENTS

CN  1292583  4/2001
CN  1216438  8/2005
(Continued)

OTHER PUBLICATIONS

U.S. Appl. No. 60/833,587, filed Jan. 5, 2007, Hobson et al.

*Primary Examiner* — Graham Smith
(74) *Attorney, Agent, or Firm* — Treyz Law Group, P.C.; G. Victor Treyz; Michael H. Lyons

(57) ABSTRACT

An electronic device such as a handheld device may have a rectangular housing with a rectangular periphery. A conductive peripheral housing member may run along the rectangular periphery and may surround the rectangular housing. Radio-frequency transceiver circuitry within the electronic device may be coupled to antenna structures for transmitting and receiving radio-frequency signals. The conductive peripheral housing member may form part of the antenna structures. A gap in the conductive peripheral housing member may be filled with dielectric. The conductive peripheral housing member may be configured to form a recess. The recess may have the shape of a rectangle, oval, diamond, or other shape that overlaps and is bisected by the gap. The recess may also have the shape of a groove that extends around the entire periphery of the housing. The dielectric in the recess may include one or more different materials such as clear and opaque polymers.

18 Claims, 19 Drawing Sheets

(51) Int. Cl.
  *H01Q 1/22* (2006.01)
  *H04M 1/02* (2006.01)
  *H01Q 9/04* (2006.01)
  *H01Q 13/10* (2006.01)
  *H01Q 21/28* (2006.01)
  *H01Q 21/00* (2006.01)
  *H04W 88/02* (2009.01)

(52) U.S. Cl.
  CPC .......... *H01Q 9/0407* (2013.01); *H01Q 13/10* (2013.01); *H01Q 21/00* (2013.01); *H01Q 21/28* (2013.01); *H04M 1/026* (2013.01); *H04W 88/02* (2013.01)

(58) Field of Classification Search
  USPC ....................................................... 343/702
  See application file for complete search history.

(56) References Cited

U.S. PATENT DOCUMENTS

| | | |
|---|---|---|
| 4,879,755 A | 11/1989 | Stolarczyk et al. |
| 4,894,663 A | 1/1990 | Urbish |
| 4,980,694 A | 12/1990 | Hines |
| 5,021,010 A | 6/1991 | Wright |
| 5,041,838 A | 8/1991 | Liimatainen |
| 5,048,118 A | 9/1991 | Brooks |
| 5,061,943 A | 10/1991 | Rammos |
| 5,105,396 A | 4/1992 | Ganter et al. |
| 5,381,387 A | 1/1995 | Blonder et al. |
| 5,408,241 A | 4/1995 | Shattuck |
| 5,473,252 A | 12/1995 | Renz et al. |
| 5,561,437 A | 10/1996 | Phillips |
| 5,684,492 A | 11/1997 | Kagoshima et al. |
| 5,754,143 A | 5/1998 | Warnagiris |
| 5,798,984 A | 8/1998 | Koch |
| 5,828,341 A | 10/1998 | Delamater |
| 6,011,699 A | 1/2000 | Murray |
| 6,097,345 A | 8/2000 | Walton |
| 6,147,652 A | 11/2000 | Sekine |
| 6,269,054 B1 | 7/2001 | Truini |
| 6,282,433 B1 | 8/2001 | Holshouser |
| 6,337,662 B1 | 1/2002 | Cassel |
| 6,373,439 B1 | 4/2002 | Zurcher et al. |
| 6,518,929 B1 | 2/2003 | Gilmore |
| 6,622,031 B1 | 9/2003 | McCleary |
| 6,662,028 B1 | 12/2003 | Hayes et al. |
| 6,670,923 B1 | 12/2003 | Kadambi et al. |
| 6,683,578 B2 | 1/2004 | Nishikido et al. |
| 6,741,214 B1 | 5/2004 | Kadambi et al. |
| 6,747,601 B2 | 6/2004 | Boyle |
| 6,762,723 B2 | 7/2004 | Nallo |
| 6,825,811 B2 | 11/2004 | Iwai et al. |
| 6,853,605 B2 | 2/2005 | Fujisawa et al. |
| 6,856,294 B2 | 2/2005 | Kadambi et al. |
| 6,968,508 B2 | 11/2005 | Lucaci |
| 6,980,154 B2 | 12/2005 | Vance et al. |
| 7,027,838 B2 | 4/2006 | Zhou et al. |
| 7,035,170 B2 | 4/2006 | Narayanaswami et al. |
| 7,116,276 B2 | 10/2006 | Lee |
| 7,119,747 B2 | 10/2006 | Lin et al. |
| 7,123,208 B2 | 10/2006 | Puente Baliarda et al. |
| 7,215,600 B1 | 5/2007 | DeRosa |
| 7,595,759 B2 | 9/2009 | Schlub et al. |
| 7,612,725 B2 | 11/2009 | Hill et al. |
| 7,714,790 B1 | 5/2010 | Feldstein et al. |
| 7,768,462 B2 | 8/2010 | Zhang et al. |
| 7,768,468 B2 | 8/2010 | Gustafson et al. |
| 7,889,139 B2 | 2/2011 | Hobson et al. |
| 8,009,110 B2 | 8/2011 | Teng et al. |
| 8,269,675 B2 | 9/2012 | Kough et al. |
| 8,270,914 B2 | 9/2012 | Pascolini et al. |
| 8,489,162 B1* | 7/2013 | Dou ................. H01Q 1/243 343/746 |
| 8,665,164 B2 | 3/2014 | Hill et al. |
| 2001/0043514 A1 | 11/2001 | Kita |
| 2002/0126236 A1 | 9/2002 | Hiratsuka |
| 2003/0107518 A1 | 6/2003 | Li et al. |
| 2003/0124985 A1 | 7/2003 | Shin et al. |
| 2004/0017318 A1 | 1/2004 | Annabi |
| 2004/0090377 A1 | 5/2004 | Dai et al. |
| 2004/0145521 A1 | 7/2004 | Hebron et al. |
| 2004/0227674 A1 | 11/2004 | Asano et al. |
| 2004/0257283 A1 | 12/2004 | Asano et al. |
| 2005/0099344 A1 | 5/2005 | Okubo et al. |
| 2005/0270242 A1 | 12/2005 | Qi et al. |
| 2006/0001582 A1 | 1/2006 | Hayashi |
| 2006/0055606 A1 | 3/2006 | Boyle |
| 2006/0097941 A1 | 5/2006 | Bettner et al. |
| 2006/0125703 A1 | 6/2006 | Ma et al. |
| 2006/0244663 A1 | 11/2006 | Fleck et al. |
| 2007/0116947 A1 | 5/2007 | Hackbarth et al. |
| 2007/0176843 A1 | 8/2007 | Qureshi |
| 2007/0182658 A1 | 8/2007 | Ozden |
| 2007/0227674 A1 | 10/2007 | Haslem et al. |
| 2008/0143613 A1 | 6/2008 | Iwai et al. |
| 2008/0150811 A1 | 6/2008 | Honda et al. |
| 2008/0231522 A1* | 9/2008 | Montgomery ......... H01Q 13/10 343/702 |
| 2009/0009007 A1 | 1/2009 | Kato et al. |
| 2009/0153407 A1 | 6/2009 | Zhang |
| 2009/0231215 A1 | 9/2009 | Taura |
| 2009/0256758 A1 | 10/2009 | Schlub et al. |
| 2009/0262029 A1 | 10/2009 | Chiang et al. |
| 2010/0053002 A1 | 3/2010 | Wojack et al. |
| 2010/0073241 A1 | 3/2010 | Ayala Vazquez et al. |
| 2010/0123633 A1 | 5/2010 | Ozden et al. |
| 2010/0321325 A1 | 12/2010 | Springer et al. |
| 2011/0006953 A1 | 1/2011 | Chiang et al. |
| 2011/0133995 A1 | 6/2011 | Pascolini et al. |
| 2011/0241949 A1 | 10/2011 | Nickel et al. |
| 2013/0229322 A1 | 9/2013 | Wang |

FOREIGN PATENT DOCUMENTS

| | | |
|---|---|---|
| CN | 101207229 | 6/2008 |
| CN | 202025842 | 11/2011 |
| EP | 1093098 | 4/2001 |
| EP | 1 286 413 | 2/2003 |
| EP | 1 315 238 | 5/2003 |
| EP | 1324425 | 7/2003 |
| EP | 1 401 050 | 3/2004 |
| EP | 2034558 | 3/2009 |
| JP | 11-340867 | 12/1999 |
| JP | 2001185927 | 7/2001 |
| JP | 2005142785 | 6/2005 |
| JP | 2008159636 | 7/2008 |
| JP | 2009095067 | 4/2009 |
| TW | 310084 | 7/1997 |
| TW | 200929687 | 7/2009 |
| WO | 02/078123 | 10/2002 |
| WO | 2004/001894 | 12/2003 |
| WO | 2005032130 | 4/2005 |
| WO | 2005/109567 | 11/2005 |
| WO | 2006/114771 | 11/2006 |
| WO | 2007/039668 | 4/2007 |
| WO | 2007125752 | 11/2007 |
| WO | 2010025023 | 3/2010 |

* cited by examiner

PERIPHERAL ELECTRONIC DEVICE HOUSING MEMBERS WITH GAPS AND DIELECTRIC COATINGS

This application is a continuation of U.S. patent application Ser No. 12/973,586, filed Dec. 10, 2010 which is hereby incorporated herein in its entirety. This application claims the benefit of and claims priority to U.S. patent application Ser. No. 12/973,586, filed Dec. 10, 2010.

BACKGROUND

This relates generally to electronic devices, and more particularly, to housing members in electronic devices such as electronic devices with wireless communications circuitry.

Electronic devices such as portable computers and cellular telephones are often provided with wireless communications capabilities. For example, electronic devices may use long-range wireless communications circuitry such as cellular telephone circuitry to communicate using cellular telephone bands at 850 MHz, 900 MHz, 1800 MHz, 1900 MHz, and 2100 MHz. Electronic devices may use short-range wireless communications links to handle communications with nearby equipment. For example, electronic devices may communicate using the WiFi® (IEEE 802.11) bands at 2.4 GHz and 5 GHz and the Bluetooth® band at 2.4 GHz. Satellite navigation system signals may be received in bands such as the Global Positioning System band at 1575 MHz.

To satisfy consumer demand for small form factor wireless devices, manufacturers are continually striving to implement wireless communications circuitry such as antenna components using compact structures. To address these concerns, some electronic devices use metal portions of a device housing in forming device antennas.

In antenna configurations such as these, it would be desirable to ensure that antenna operation is relatively immune to the influence of contact with the antenna structures. For example, antenna operation should be satisfactory even in the event that a user grasps an electronic device housing in a way that causes the user's hand to come into contact with the antenna structures. It may also be desirable to incorporate dielectric materials into device housing structures to enhance device aesthetics.

It would therefore be desirable to be able to provide improved housing structures for electronic devices such as electronic devices with antenna structures formed from device housing structures.

SUMMARY

An electronic device such as a handheld device may have a rectangular housing with a rectangular periphery. A peripheral housing member may run along the rectangular periphery and may surround the rectangular housing. The peripheral housing member may be formed from a conductive material such as metal.

The peripheral housing member may have a groove or other recess. The groove may run along the entirety of the peripheral housing member and may surround the rectangular housing. Recess shapes such as ovals, diamonds, and rectangles may be used for recesses that do not run around the entire rectangular housing.

Groove-shaped recesses and other recesses in the peripheral housing member may be filled with dielectric. The dielectric may include one or more polymers or other non-conductive materials.

Radio-frequency transceiver circuitry within the electronic device may be coupled to antenna structures for transmitting and receiving radio-frequency signals. The peripheral housing member may form part of the antenna structures. One or more gaps in the peripheral housing member may be filled with dielectric. The groove or other recess structures in the peripheral housing member may be configured to overlap the gaps.

Further features of the invention, its nature and various advantages will be more apparent from the accompanying drawings and the following detailed description of the preferred embodiments.

DETAILED DESCRIPTION

Electronic devices may be provided with wireless communications circuitry. The wireless communications circuitry may be used to support wireless communications in one or more wireless communications bands. The wireless communications circuitry may include one or more antennas.

The antennas can include loop antennas, inverted-F antennas, strip antennas, planar inverted-F antennas, slot antennas, hybrid antennas that include antenna structures of more than one type, or other suitable antennas. Conductive structures for the antennas may, if desired, be formed from conductive electronic device structures. The conductive electronic device structures may include conductive housing structures. The conductive housing structures may include a conductive peripheral housing member that runs around the periphery of an electronic device. The conductive peripheral housing member may serve as a bezel for a planar structure such as a display, may serve as sidewall structures for a device housing, or may form other housing structures. Gaps in the peripheral conductive member may be associated with the antennas.

Figure 1:
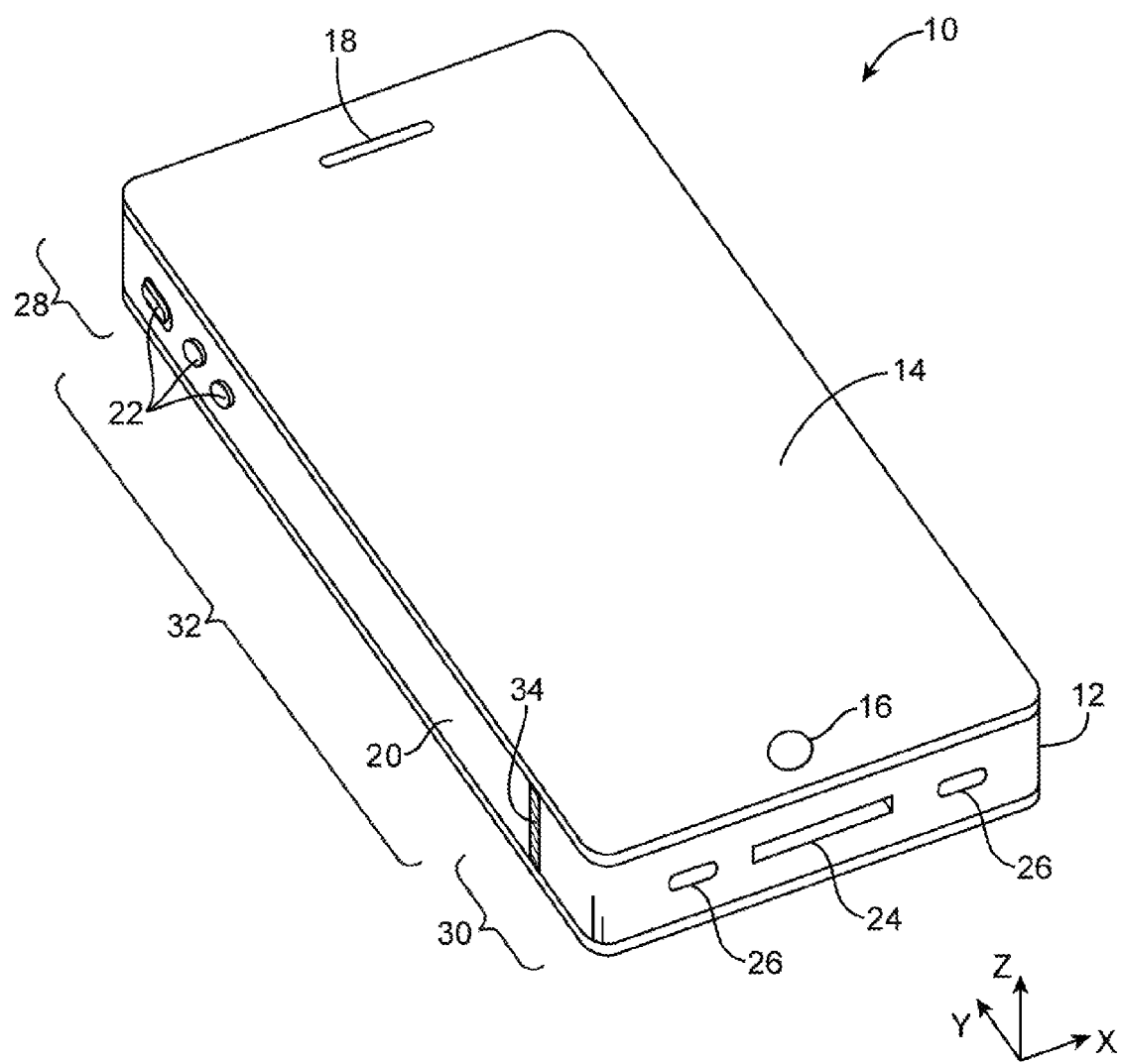
FIG. 1 is a perspective view of an illustrative electronic device with wireless communications circuitry in accordance with an embodiment of the present invention.

An illustrative electronic device of the type that may be provided with one or more antennas is shown in FIG. 1. Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a cellular telephone, a media player, other handheld devices, etc.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may, for example, be a touch screen that incorporates capacitive touch sensor electrodes. Display 14 may include image pixels formed form light-emitting diodes (Leeds), organic Leeds (Olds), plasma cells, electronic ink elements, liquid crystal display (LCD) components, or other suitable image pixel structures. A cover glass layer may cover the surface of display 14. Buttons such as button 16 may pass through openings in the cover glass. Opening 18 in the cover glass may be used to form a speaker port.

Housing 12 may include structures such as conductive peripheral housing member 20. Member 20 may run around the substantially rectangular periphery of device 10 and display 14 and may surround rectangular device housing 12. Member 20 or part of member 20 may serve as a bezel for display 14 (e.g., a cosmetic trim that surrounds all four sides of display 14 and/or helps hold display 14 to device 10). Member 20 may also, if desired, form sidewall structures for device 10.

Member 20 may be formed of a conductive material such as metal. Member 20 may, for example, be formed from a metal such as stainless steel, aluminum, or other suitable materials. One, two, or more than two separate structures may be used in forming member 20. In a typical configuration, member 20 may have a thickness in vertical dimension Z of about 3 mm to 2 cm (as an example). Lateral dimensions X and Y of device 10 may be (in an example of the type shown in FIG. 1) about 3 to 8 cm and about 5 to 20 cm, respectively (as examples). Other lateral and vertical dimensions may be used if desired (e.g., less than 3 mm, more than 3 mm, more than 2 cm, more than 20 cm, etc.).

It is not necessary for member 20 to have a uniform cross-section. For example, the top (highest Z) portion of member 20 may, if desired, have an inwardly protruding lip that helps hold display 14 in place. If desired, the bottom portion of member 20 may also have an enlarged lip (e.g., in the plane of the rear surface of device 10). In the example of FIG. 1, member 20 has substantially straight vertical sidewalls. This is merely illustrative. The sidewalls of member 20 may be curved or may have any other suitable shape.

In some configurations, grooves or other recessed portions may be formed in member 20 (e.g., in the exterior of member 20). These grooves or other recessed portions may be filled with materials such as dielectrics. Dielectric coatings that cover substantially all of the exterior surface of member 20 may also be used. By incorporating one or more dielectric structures over some or all of the exterior portions of member 20, the immunity of the wireless performance of device 10 to contact by an external object such as a user's fingers may be enhanced and/or device aesthetics may be enhanced.

Openings may be formed in one or more portions of conductive peripheral housing member 20. For example, openings 22 may be formed to accommodate buttons, opening 24 may be formed to accommodate an input-output port, and openings 26 may be used in forming speaker and microphone ports. Openings may also be formed for other components (e.g., buttons, audio jacks, other connectors, status indicators, other user interface components, etc.).

Display 14 may include conductive structures such as an array of capacitive touch sensor electrodes, conductive lines for addressing pixel elements, driver circuits, etc. Housing 12 also include internal structures such as metal frame members, a planar housing member (sometimes referred to as a modulate) that spans the walls of housing 12 (i.e., a substantially rectangular member that is welded or otherwise connected between opposing sides of the interior of member 20), printed circuit boards, and other internal conductive structures. These conductive structures may be located in the center of housing 12 (as an example).

In regions 28 and 30, openings may be formed between portions of conductive peripheral member 20 and the internal conductive housing structures and conductive electrical components that make up device 10. These openings may be filled with air, plastic, or other dielectrics. Conductive housing structures and other conductive structures in central portion 32 of device 10 may serve as a ground plane for the antennas in device 10. The openings in regions 28 and 30 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, or may otherwise serve as part of antenna structures formed in regions 28 and 30.

Portions of member 20 may be provided with gap structures. For example, member 20 may be provided with one or more gaps such as gap 34, as shown in FIG. 1. The gaps may be filled with dielectric such as polymer, ceramic, glass, air, etc. Gaps such as gap 34 may divide member 20 into one or more segments. There may be, for example, two segments of member 20 (e.g., in an arrangement with two gaps), three segments of member 20 (e.g., in an arrangement with three gaps), four segments of member 20 (e.g., in an arrangement with four gaps, etc.). The segments of peripheral conductive member 20 that are formed in this way may form parts of antennas in device 10.

In a typical scenario, device 10 may have upper and lower antennas (as an example). An upper antenna may, for example, be formed at the upper end of device 10 in region 28. A lower antenna may, for example, be formed at the lower end of device 10 in region 30. The antennas may be used separately to cover separate communications bands of interest or may be used together to implement an antenna diversity scheme or a multiple-input-multiple-output (MIMO) antenna scheme.

Antennas in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, etc.

Figure 2:
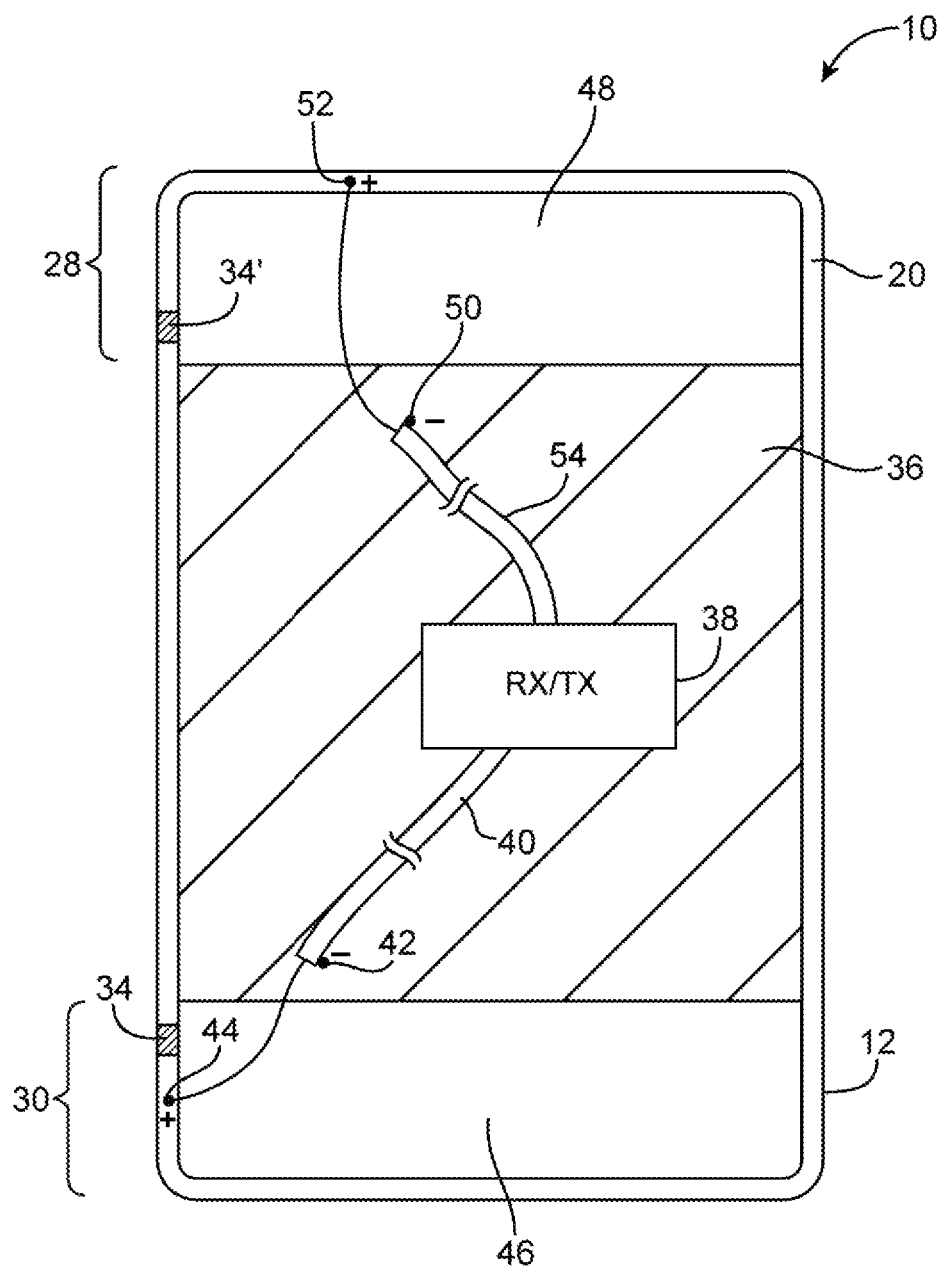
FIG. 2 is a top interior view of an illustrative electronic device with wireless communications circuitry that includes exposed antenna structures such as a conductive peripheral housing member with gaps in accordance with an embodiment of the present invention.

A top view of device 10 showing interior portions of housing 12 is shown in FIG. 2. As shown in FIG. 2, device 10 may have internal conductive structures such as conductive housing structures 36. Structures 36 may include, for example, planar metal structures (e.g., a conductive plate such as a modulate). Structures 36 may be mounted between opposing edges of conductive peripheral housing member 20 (e.g., the left and right edges of member 20 in the orientation of FIG. 2). Structures 36 may include housing members, brackets and other support structures, circuits on printed circuit boards and other substrates, electrical components such as connectors and switches, and other conductive structures. These structures may form a ground plane for one or more antennas in device 10.

For example, structures 36 may form a ground plane for an antenna in region 30 and a ground plane for an antenna in region 28 (as an example). In region 30, an antenna may be formed that includes portions of conductive housing structures 36 and the portions of conductive peripheral housing member 20 that surround dielectric region (opening) 46. In region 28, an antenna may be formed that includes the portions of conductive housing structures 36 and the portions of conductive peripheral housing member 20 that surrounds opening 48.

The antennas in regions 28 and 30 may be fed using any suitable antenna feed arrangement. As shown in FIG. 2, for example, an antenna in region 30 may be fed using positive antenna feed terminal 44 and ground antenna feed terminal 42. An antenna in region 28 may be fed using positive antenna feed terminal 52 and ground antenna feed terminal 50. Transmission line 40 may be coupled between the antenna feed for the antenna in region 30 and radio-frequency transceiver circuitry 38. Transmission line 54 may be coupled between radio-frequency transceiver circuitry and the antenna in region 28. Transmission lines 40 and 54 may include coaxial cables, micro strip transmission lines, stripling transmission lines, edge coupled micro strip transmission lines, edge coupled stripling transmission lines, and other transmission line structures. If desired, matching networks, switches, filters, conductive structures that serve as matching networks, and other circuits may be used in coupling transmission lines 40 and 54 to antenna structures in device 10. The example of FIG. 2 is merely illustrative.

Radio-frequency transceiver circuitry 38 may include radio-frequency (RF) transceiver circuitry formed from one or more integrated circuits, power amplifier circuitry, low-noise input amplifiers, passive RF components, and other circuitry for handling RF wireless signals. Circuitry 38 may include satellite navigation system receiver circuitry such as Global Positioning System (GPS) receiver circuitry (e.g., for receiving satellite positioning signals at 1575 MHz). Transceiver circuitry 38 may also include wireless local area network circuits for handling 2.4 GHz and 5 GHz bands for WiFi® (IEEE 802.11) communications and the 2.4 GHz Bluetooth® communications band. Circuitry 38 may include cellular telephone transceiver circuitry for handling wireless communications in cellular telephone bands such as bands at 850 MHz, 900 MHz, 1800 MHz, 1900 MHz, and 2100 MHz or other cellular telephone bands of interest.

During operation of the transceiver circuitry 38 in conveying antenna signals through antennas in regions 28 and 30, the presence or absence of a user's fingers or other external objects in the vicinity of the antennas can affect the efficiency with which antenna signals are transmitted and received. In antennas that contains gaps in conductive peripheral housing member 20 (i.e., in an antenna of region 30 that contains gap 34 and in an antenna of region 28 that contains gap 34'), antenna performance can be affected more when conductive peripheral housing member 20 is contacted by a user's fingers or other external objects in the vicinity of the gaps than when other portions of conductive peripheral housing member 20 is contacted. By including dielectric material on some or all of the exterior portions of conductive peripheral housing member 20, particularly in the vicinity of antenna gaps such as gaps 34' and 34 of FIG. 2, antenna performance can be desensitized to contact between external objects and conductive peripheral housing member 20 in the vicinity of gaps 34' and 34.

Figure 3:
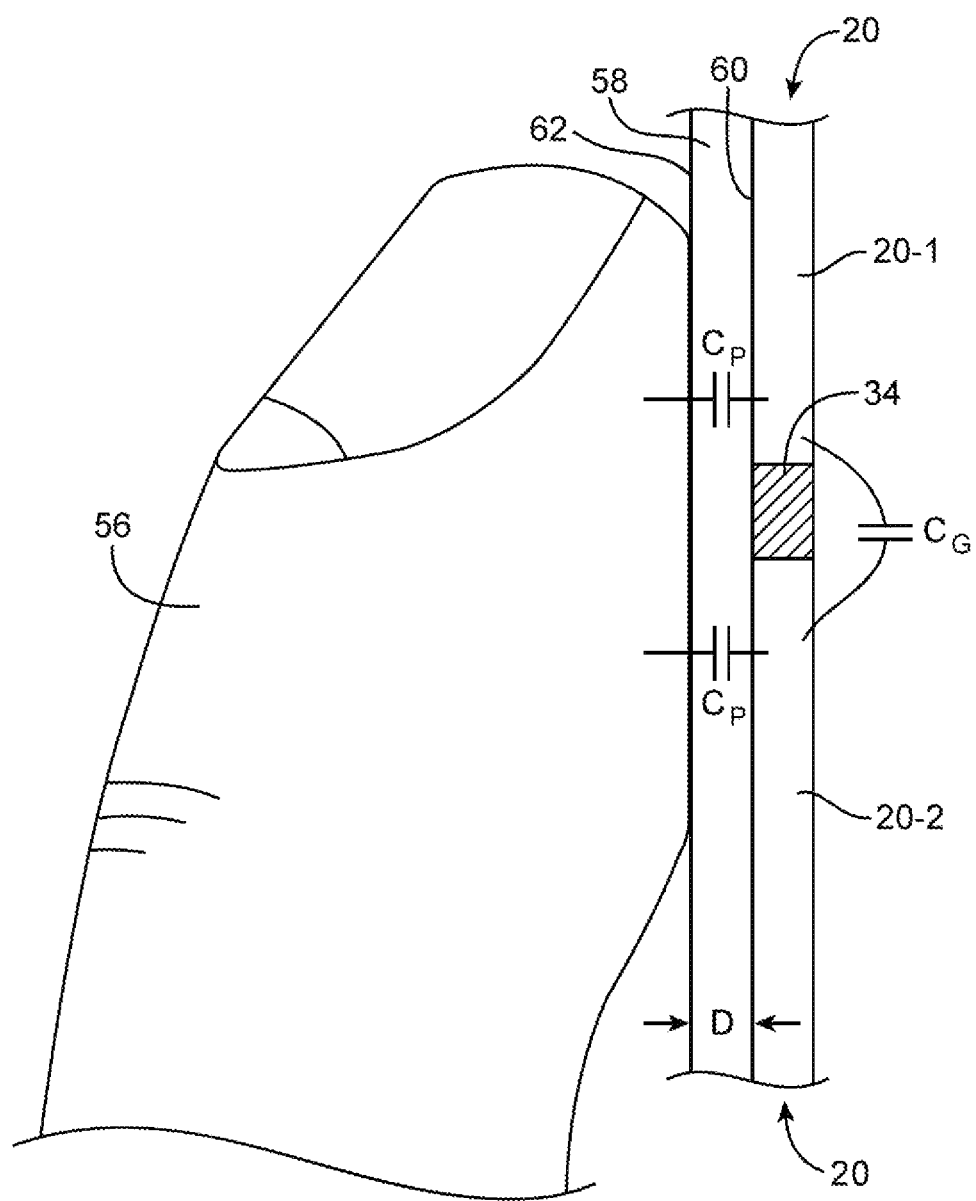
FIG. 3 is a cross-sectional top view of a portion of a device housing showing how capacitance between a conductive peripheral housing member and an external object such as a finger of a user can be reduced by interposing a dielectric coating between the conductive peripheral housing member and the finger in accordance with an embodiment of the present invention.

FIG. 3 shows how the inclusion of dielectric 58 on exterior surface 60 of conductive peripheral housing member 20 may reduce the sensitivity of an antenna gap to contact with an external object. As shown in FIG. 3, there may be a capacitance Cg that is associated with gap 34 in conductive peripheral housing member 20. Capacitance Cg is interposed within the conductive path between portion 20-1 and 20-2 of conductive peripheral housing member 20 and affects the degree to which transmission line 40 is impedance matched to the antenna.

When a user's finger such as finger 56 of FIG. 3 contacts the antenna, capacitances Cp may be produced between member 20 and finger 56. In the absence of dielectric layer 58, the values of capacitances Cp may be large. Large values of Cp may alter the total effective capacitance between segments 20-1 and 20-2 (i.e., this capacitance may be increase above the nominal value of Cg in the absence of finger 56). Large value of Cp may therefore detune the antenna sufficiently to have an adverse effect on impedance matching and antenna performance.

When dielectric 58 is present, finger 56 may contact surface 62 of dielectric 58 rather than surface 60 of conductive peripheral housing member 20. Because of the resulting separation D (e.g., a D value of 0.01 to 1 mm, 0.5 to 3 mm, more than 0.4 mm, more than 2 mm, less than 2 mm, etc.) between finger 56 and surface 60 of conductive peripheral housing member 20, the values of capacitances Cp may be reduced. When Cp is small, the nominal value of the capacitance between segments 20-1 and 20-2 will tend to be unaffected and the antenna in which gap 34 is located will operate satisfactorily.

Dielectric 58 may be formed from epoxy, plastic, polymers such as polycarbonate (PC), acrylonitrile butadiene styrene (ABS), PC/ABS blends, polybutylene terephthalate (PBT), PC/PBT blends, other polymers, materials that include microspheres, voids, or other elements that reduce the dielectric constant of the materials, glass, ceramic (e.g., colored or clear ceramic that is incorporated into housing 12 using a ceramic injection molding process), paint, or fiber-based composites such as fiberglass, glass-filled nylon (e.g., glass fiber filled nylon) and other strengthened polymers, colored or clear plastic (polymers), other suitable dielectric materials or combinations of two or more of these materials.

The size, shape, and location of dielectric 58 may be selected to enhance antenna performance (e.g., to help ensure that antenna performance is immune to the effects of contact between a user's fingers and conductive peripheral housing member 20) while maintaining structural integrity and desired levels of aesthetics for device 10. Dielectric 58 may be provided in the form of one or more layers of coating material, may be used to cover substantially all of the exterior surface of conductive peripheral housing member 20, may be formed within a groove or one or more other recesses in conductive peripheral housing member 20, or may be otherwise incorporated into housing 12 in the vicinity of gaps such as gaps 34 and 34' of FIG. 2.

Figure 4:
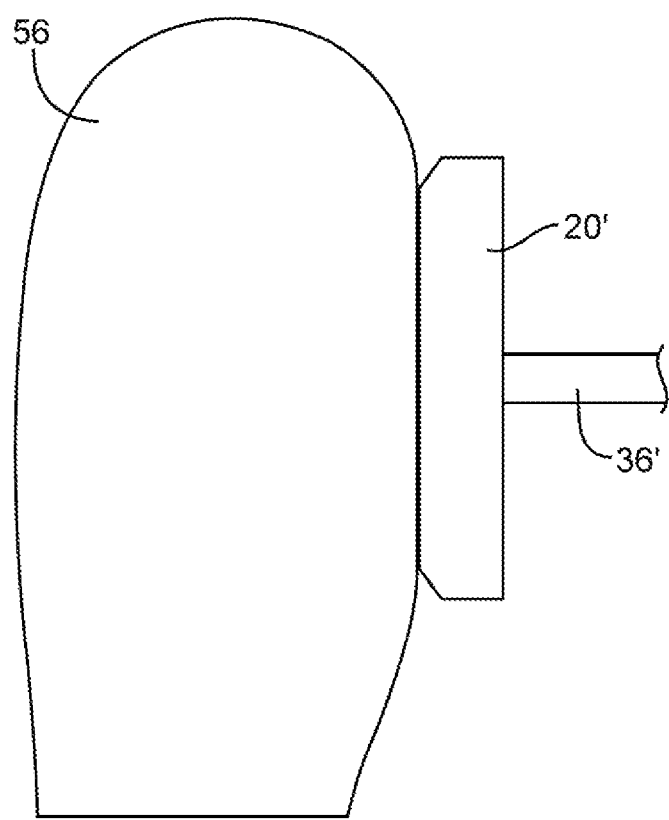
FIG. 4 is cross-sectional side view of a conventional housing band member in contact with the finger of a user.

A cross-sectional view taken along the length of a conventional conductive peripheral housing member is shown in FIG. 4. In the arrangement of FIG. 4, finger 56 is in close contact with conductive peripheral contact member 20' (which is connected to conventional midplate member 36'). Member 20' is formed from solid metal and does not have any coatings. As a result, conventional conductive peripheral housing members such as member 20' of FIG. 4 may give rise to relatively large coupling capacitances Cp with finger 56.

Figure 5:
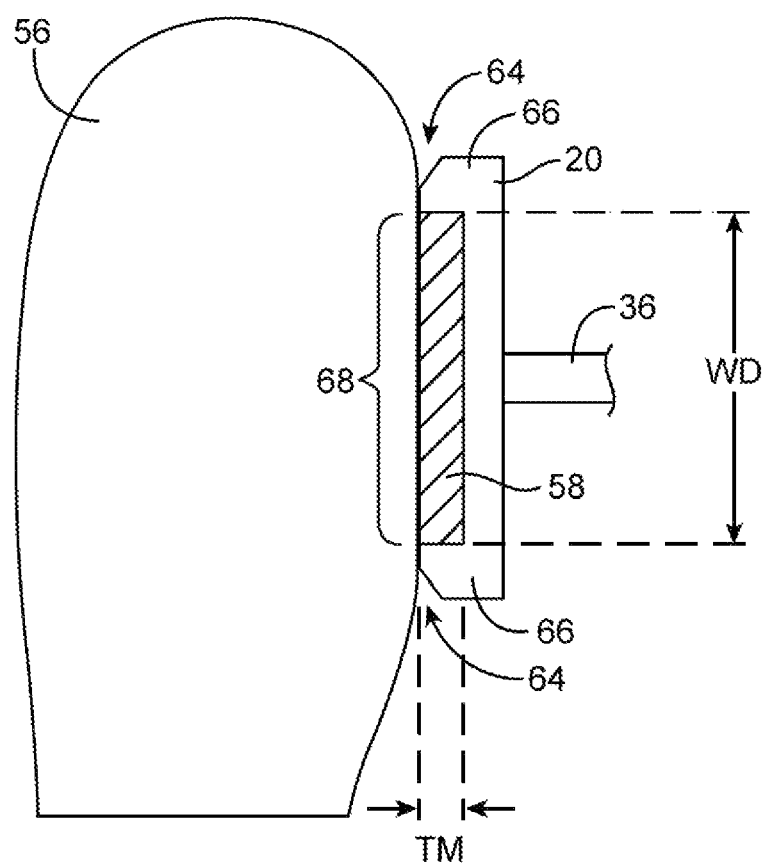
FIG. 5 is a cross-sectional side view of a conductive peripheral housing member with a dielectric coating in accordance with an embodiment of the present invention.

FIG. 5 is a cross-sectional view of a conductive peripheral housing member such as member 20 of FIG. 1 that has been provided with dielectric 58 within a groove. In the example of FIG. 5, the groove has been formed by recess 68 in conductive peripheral housing member 20. The recess forms a channel with a rectangular cross-section of thickness TH and width WD. Sidewalls 66 may enclose the sides of the channel (i.e., the top and bottom surfaces of dielectric 58 in the orientation of FIG. 5). Optional chamfers 64 may be provided along the edges of sidewalls 66. Groove 68 may run along all of conductive peripheral housing member 20 and may surround the rectangular housing of device 10.

Figure 6:
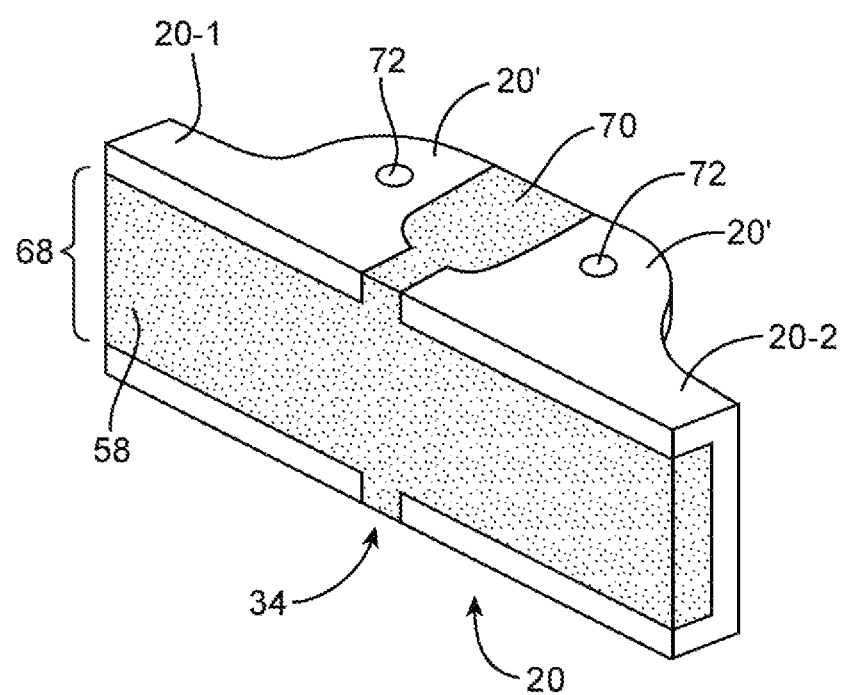
FIG. 6 is a perspective view of a conductive peripheral housing member with a dielectric coating in the vicinity of a gap in the conductive peripheral housing member in accordance with an embodiment of the present invention.

FIG. 6 is a perspective view of a portion of a conductive peripheral housing member such as member 20 of FIG. 5 in the vicinity of gap 34. As shown in FIG. 6, member 20 may be provided with inwardly protruding portions such as portions 20' to enlarge the area over which segments 20-1 and 20-2 of member 20 are connected and thereby enhance the strength of the dielectric connection between segments 20-1 and 20-2. Protruding portions 20' may form a relatively large gap such as gap 70 (i.e., a gap that is wider than gap 34 and that therefore has a capacitance significantly less than capacitance Cg of FIG. 3) and may have associated engagement features such as holes 72 that are filled with dielectric 58. Gap 34 may be, for example, about 0.1 to 1 mm wide and gap 70 may be about 0.5 to 4 mm wide (as examples).

Figure 7:
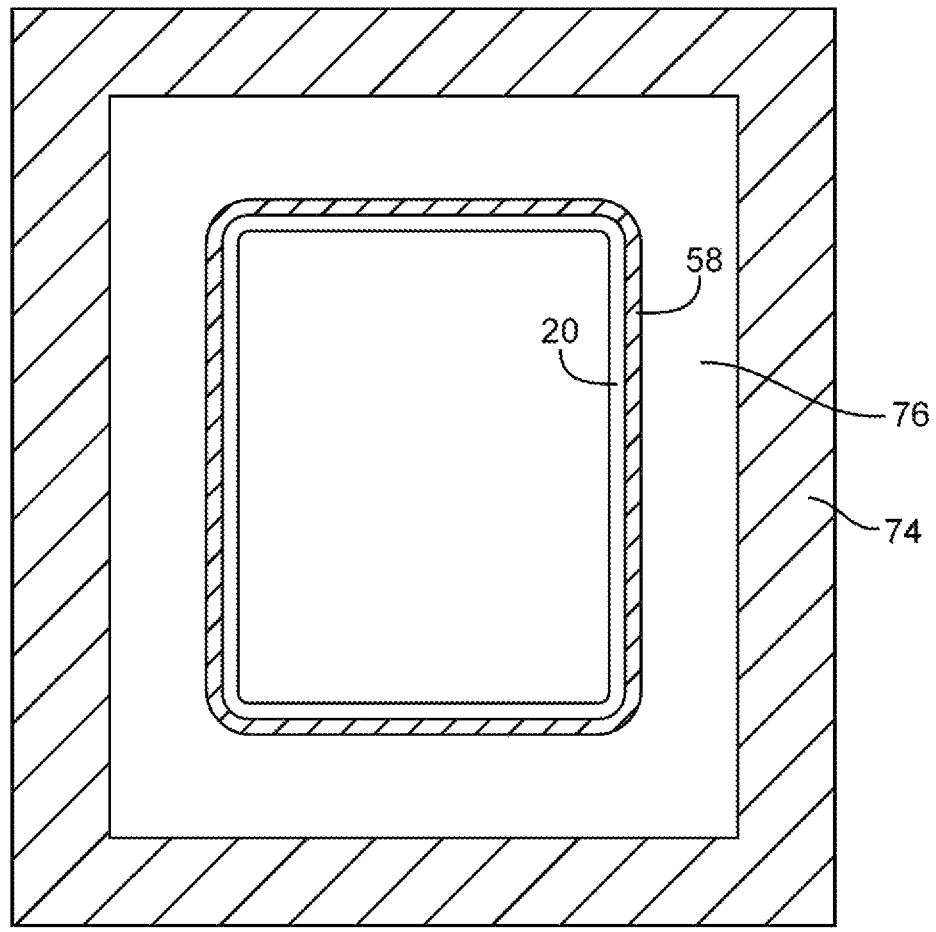
FIG. 7 is a diagram of a chamber of the type that may be used in forming a dielectric coating for a conductive peripheral housing member in accordance with an embodiment of the present invention.

Dielectric coating 58 may be formed by filling recesses such as recess 68 with a liquid dielectric and curing the dielectric (e.g., using thermal curing or ultraviolet light curing). If desired, a substantially solid dielectric member 58 may be attached to member 20 by heating member 58 in a chamber. As shown in FIG. 7, chamber 74 may be used to heat cavity 76. Dielectric member 58 may be molded, machined, or otherwise formed into a rectangular ring shape that surrounds the rectangular ring shape of conductive peripheral housing member 20 (e.g., before ring-shaped rectangular member 20 is connected to other structures in housing 12).

Dielectric member 58 may be formed from a polymer that shrinks when heated such as heat activated epoxy or other suitable plastic that shrinks upon application of elevated temperatures. Once heated in cavity 76, dielectric structure 58 may shrink to fill recess 68. The force imposed by the shrunken version of structure 58 may help ensure that structure 58 remains firmly attached to member 20 during use by a user. Structure 58 may be mounted within a groove or other recess in the outer surface of conductive peripheral housing member 20 or may be shrunken to coat substantially all of the surface of member 20 (e.g., the flat surface of a conductive peripheral housing member that does not have a recess).

The illustrative heated cavity arrangement of FIG. 7 in which a polymer ring is shrunken into recess 68 by heating is merely illustrative. In general, dielectric 58 may be formed within recess 68 using any suitable fabrication process (e.g., injection molding of one shot, two shots, or more than two shots of polymer, fiber-composites, ceramic, or other materials, dipping, spraying, painting, machining, shrinking, or otherwise forming dielectric 58).

If desired, conductive peripheral housing member 20 may be provided with retention features that help hold dielectric

Figure 8:
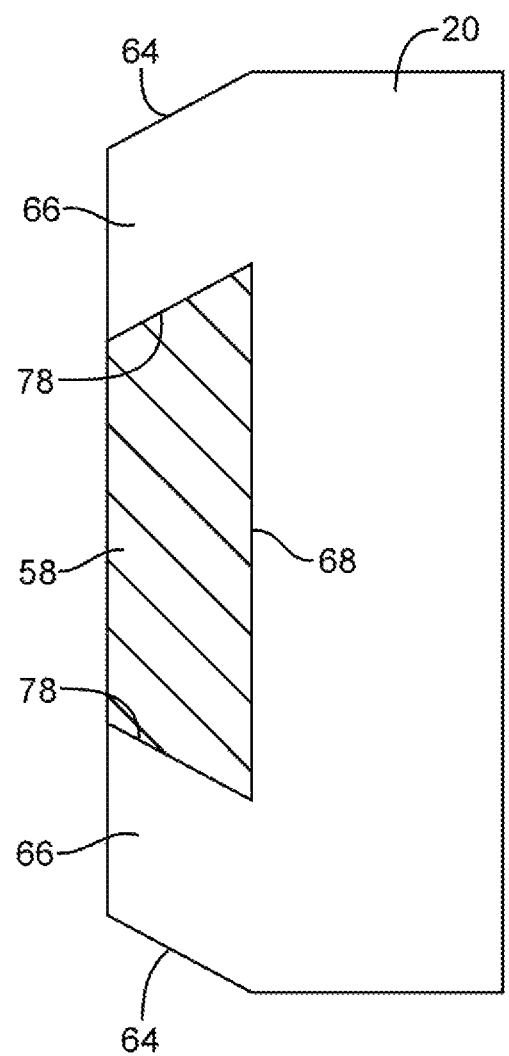
FIG. 8 is a cross-sectional side view of a conductive peripheral housing member that has an undercut shape to help retain a dielectric coating in accordance with an embodiment of the present invention.

58 in place. An example is shown in the cross-sectional view of conductive peripheral housing member 20 of FIG. 8. As shown in FIG. 8, sidewall portions 66 of conductive peripheral housing member 20 may have surfaces 78 that are slanted so that they angle inwardly towards each other. This creates overhanging portions of member 20 that trap and retain dielectric 58 within recess 68.

Figure 9:
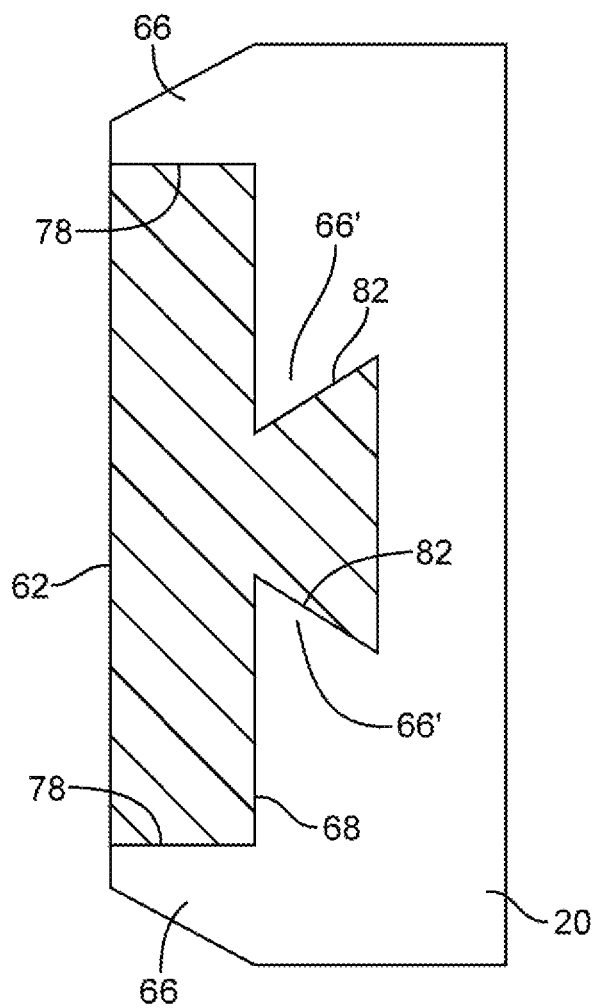
FIG. 9 is a cross-sectional side view of a conductive peripheral housing member that has a groove with straight sides to receive a dielectric coating and a retention feature to help retain the dielectric coating in accordance with an embodiment of the present invention.

Another illustrative arrangement is shown in FIG. 9. With the configuration of FIG. 9, sidewall portions 66 of member 20 have straight sidewalls 78 that are perpendicular to the plane of exterior dielectric surface 62 of dielectric 58. Member 20 of FIG. 9 may, however, have a buried retention feature formed by portions 66' and associated slanted wall surfaces 82.

Figure 10:
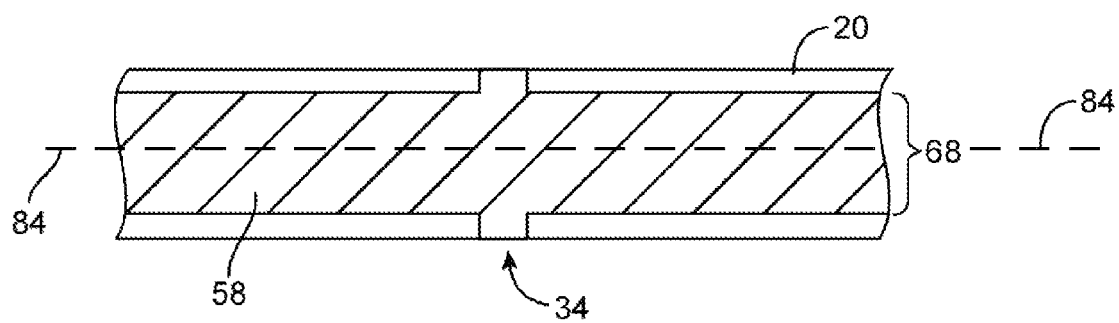
FIG. 10 is a side view of an illustrative conductive peripheral housing member having a groove that is filled with a dielectric coating in the vicinity of a gap in the conductive peripheral housing member in accordance with an embodiment of the present invention.

As shown in FIG. 10, dielectric 58 may extend continuously along longitudinal dimension 84 of conductive peripheral housing member 20 (i.e., along the dimension that runs parallel to the elongated length of conductive peripheral housing member 20 around the periphery of device 10). Groove 68 may, for example, extend continuously around the entire periphery of device 10 in a way that accommodates switches, connector openings, and other features in housing 12. Dielectric 58 may fill the entire groove. Dielectric 58 may, for example, be formed by shrinking a hoop of plastic material of the type shown in FIG. 7 so as to fill groove 68 on all four sides of device 10.

Figure 11:
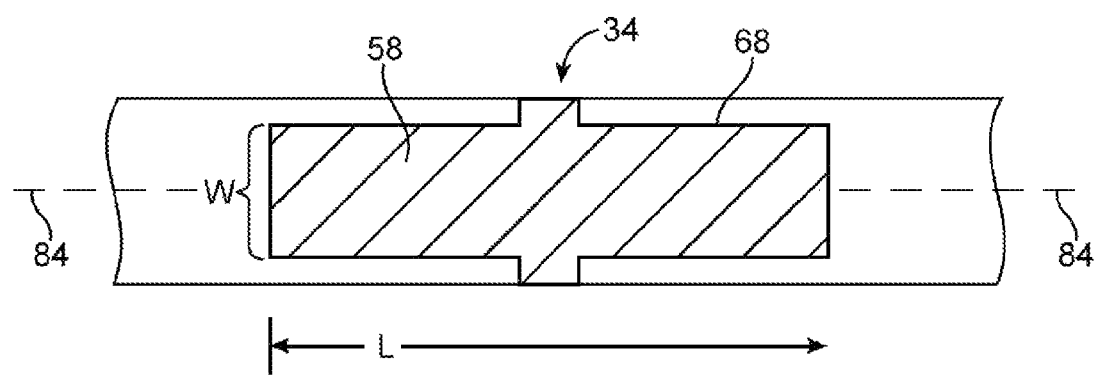
FIG. 11 is a side view of an illustrative conductive peripheral housing member having a recess in the shape of a rectangular truncated groove that is filled with a dielectric coating in the vicinity of a gap in the conductive peripheral housing member in accordance with an embodiment of the present invention.

In the example of FIG. 11, recess 68 is formed within a portion of conductive peripheral housing member 20 that is in the vicinity of gap 34 (i.e., a portion of member 20 that overlaps gap 34). In this type of arrangement, dielectric 58 does not extend around the entire periphery of device 10, but rather is confined to discrete patches at particular locations on member 20. In the FIG. 11 configuration, the patch of dielectric material 58 that has been formed within recess 68 of conductive peripheral housing member 20 has a rectangular shape with length L (measured along longitudinal axis 84 of conductive peripheral housing member 20) and has width W.

Figure 12:
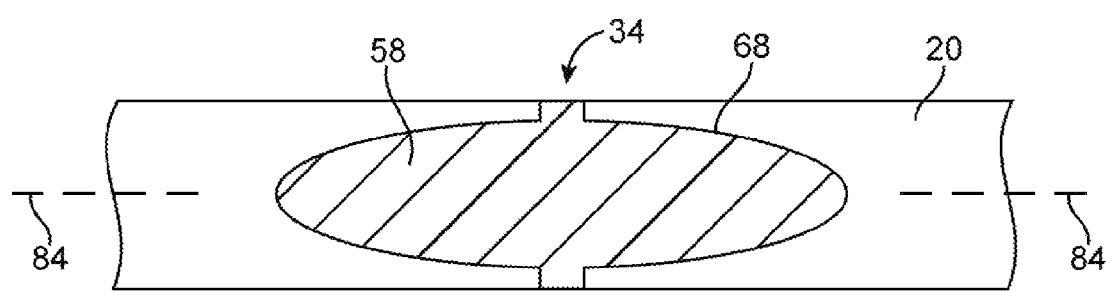
FIG. 12 is a side view of an illustrative conductive peripheral housing member having an oval-shaped recess and dielectric patch that overlaps a portion of the conductive peripheral housing member that has a gap in accordance with an embodiment of the present invention.

FIG. 12 shows how recess 68 and the dielectric that fills recess 68 may have an oval patch shape that overlaps gap 34 within the exterior of conductive peripheral housing member 20.

Figure 13:
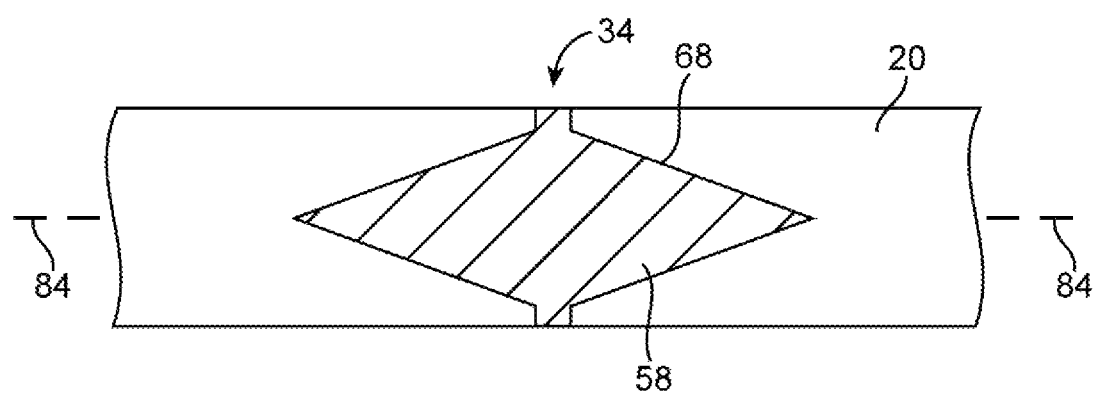
FIG. 13 is a side view of an illustrative conductive peripheral housing member having a diamond-shaped recess and dielectric structure that overlaps a portion of the conductive peripheral housing member that has a gap in accordance with an embodiment of the present invention.

In FIG. 13, dielectric 58 has been placed within a diamond-shaped recess in the exterior of conductive peripheral housing member 20.

Figure 14:
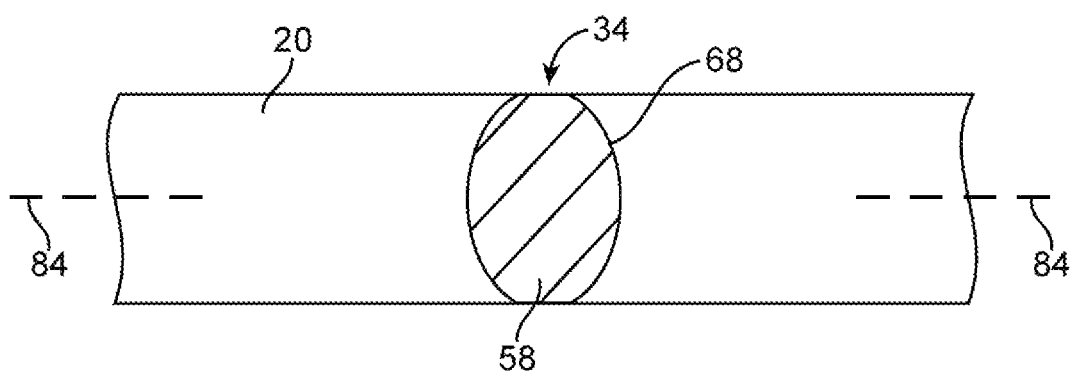
FIG. 14 is a side view of an illustrative conductive peripheral housing member with a dielectric structure having a shape with curved edges that overlaps a portion of the conductive peripheral housing member that has a gap in accordance with an embodiment of the present invention.

FIG. 14 shows an illustrative configuration for dielectric 58 and recess 68 in which the edges of the recess have a curved shape. In general, the shape of recess 68 in the exterior of conductive peripheral housing member 12 may have curved sides, straight sides, sides with combinations of curved and straight segments, or other suitable configurations.

The shape of recess 68 (whether a diamond, rectangle, oval, or other shape) may be configured to overlap gap 34 so that gap 34 bisects the shape (i.e., so that half of the recess lies on one side of gap 34 and so that half of the recess lies on the other side of gap 34 when viewed from the exterior of device 10). Other (asymmetrical) arrangements may be used if desired. Arrangements in which the recess in conductive peripheral housing member and the dielectric that fills the recess are bisected by gap 34 are merely illustrative.

The curved-sided dielectric patch of FIG. 14, the diamond shaped patch of FIG. 13 and the oval and rectangular patches of FIGS. 12 and 11, respectively, help to reduce capacitive coupling between a user's finger and conductive peripheral housing member 20 in a portion of member 20 that overlaps gap 34.

Figure 15:
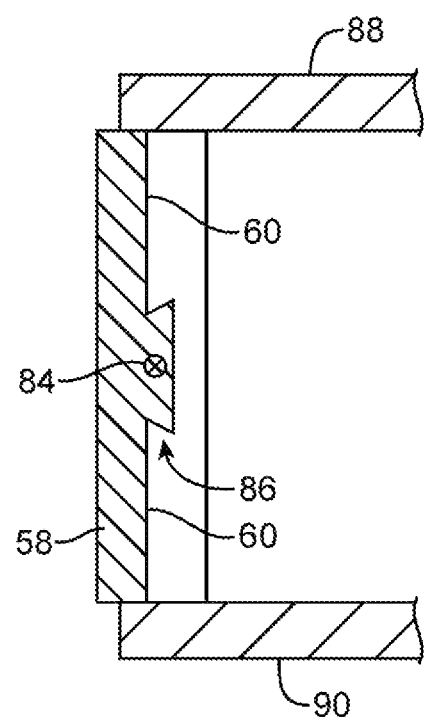
FIG. 15 is a cross-sectional view of a conductive peripheral housing member having a dielectric coating that covers substantially all of the exterior surface of the conductive peripheral housing member and having a retention feature that helps ensure that the coating stays attached to the conductive peripheral housing member in accordance with an embodiment of the present invention.

FIG. 15 is a cross-sectional view of conductive peripheral housing member 20 viewed along its longitudinal dimension 84. As shown in FIG. 15, dielectric 58 may cover substantially all of outer surface 60 of conductive peripheral housing member. Housing structures 88 and 90 (e.g., glass plates such as a cover glass plate for display 14 and a rear glass plate or other suitable housing structures) may, if desired, cover the seam between dielectric 58 and conductive peripheral housing member 20. Retention features such as retention features 86 may be formed as described in connection with FIGS. 8 and 9. Retention features such as retention feature 86 may extend along member 20 around the entire periphery of device 10 or may be placed at discrete locations around the edge of device 10.

Figure 16:
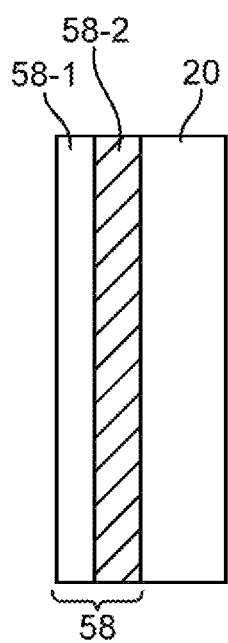
FIG. 16 is a cross-sectional view of a conductive peripheral housing member having multiple coating layers of materials such as dielectrics in accordance with an embodiment of the present invention.

As shown in FIG. 16, dielectric 58 may be formed from one or more separate dielectric structures. In the FIG. 16 example, dielectric 58 includes inner dielectric layer 58-2 and outer dielectric layer 58-1. Layers 58-2 and 58-1 may be formed using injection molding (e.g., first and second shots of plastic or injection molded ceramic), may be formed by shrinking plastic using a heated cavity of the type described in connection with FIG. 7, may be formed by forming a liquid coating layer (e.g., a layer of colored or clear epoxy, a layer of colored ink, etc.), or may be formed using other coating arrangements. With one suitable approach, inner dielectric structures 58-2 may contain polymer, ceramic, or other material with a solid (opaque) color or a pattern and outer dielectric structures 58-1 may include clear layer of polymer, ceramic, or other transparent dielectric material.

Figure 17:
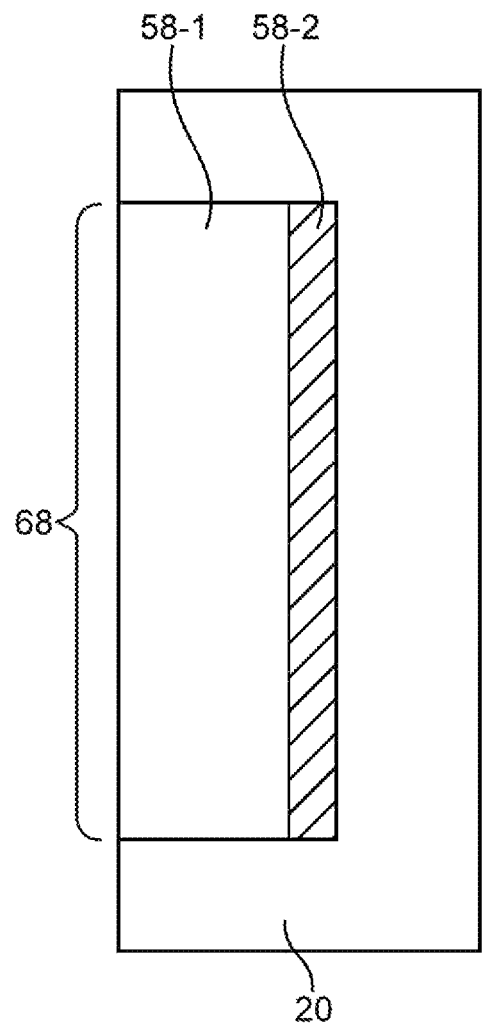
FIG. 17 is a cross-sectional view of a conductive peripheral housing member that has a groove and that has multiple coating layers of materials such as dielectrics within the groove in accordance with an embodiment of the present invention.

As shown in FIG. 17, inner dielectric structures 58-2 and outer dielectric structures 58-1 may be formed within recess 68 in conductive peripheral housing member 20 so that structures 58-1 and 58-2 are both located between opposing sidewall structures in member 20.

Figure 18:
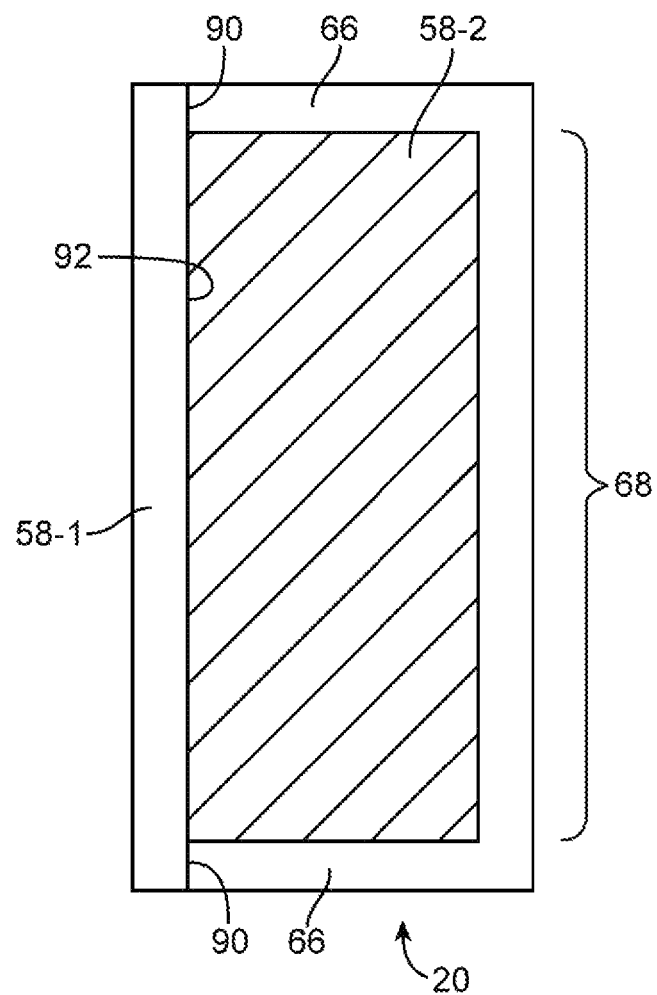
FIG. 18 is a cross-sectional view of a conductive peripheral housing member that has a groove and that has a coating layer that is received within the groove and another coating layer that covers substantially all of the exterior surface of the conductive peripheral housing member in accordance with an embodiment of the present invention.

FIG. 18 shows how inner dielectric structures 58-2 may be formed within recess 68 in conductive peripheral housing member 20 whereas outer dielectric structures 58-2 may form a coating layer that covers the exposed edge portions 90 of walls 66 of conductive peripheral housing member 20 and surface 92 of inner dielectric structures 58-2.

Figure 19:
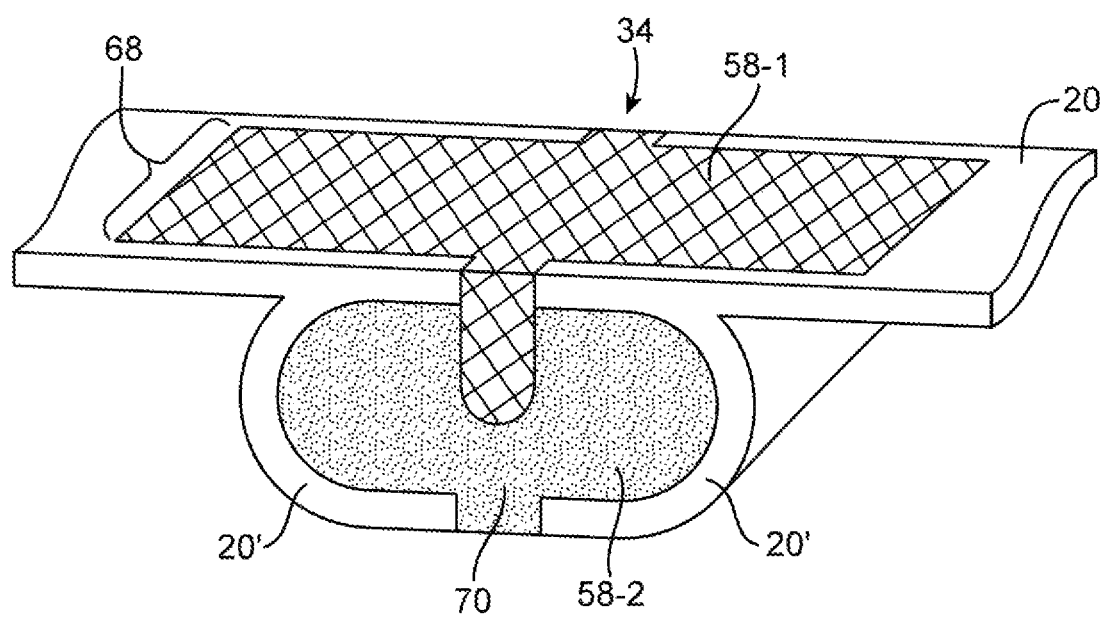
FIG. 19 is a perspective view of a portion of a conductive peripheral housing member in the vicinity of a gap showing how multiple shots of dielectric material may be used in forming a dielectric coating patch and an internal structural member in accordance with and embodiment of the present invention.

In configurations that include multiple types of dielectric (e.g., one or more layers such as layers 58-1 and 58-2), it may be desirable to tailor the properties of the dielectric layers to their location within housing 12. For example, an internal dielectric structure such as structure 58-2 of FIG. 19 may be formed from a glass-filled polymer such as glass-filled nylon (e.g., nylon with glass fibers or other strengthening structures) that exhibits good structural strength, whereas an exterior dielectric structure such as structure 58-1 of FIG. 19, which may penetrate and fill gap 34 as well as filling recess 68, may be formed from a material that has properties such as chemical resistance, stain resistance, an ability to take a smooth finish, and low losses at radio frequencies. An example of a satisfactory exterior dielectric material is PC/PBT, which may be less likely to stain then nylon. The inclusion of filler materials such as glass fibers in dielectric portion 58-2 of FIG. 19 may help strengthen the joint being formed in member 20 in the vicinity of gap 34, whereas the avoidance of glass fibers within the dielectric of gap 34 (i.e., ensuring that dielectric 58-1 is free of glass and other such strengthening structures) may help reduce antenna losses. If desired, ceramic and other materials may be used for structure 58-1 and/or structure 58-2 of FIG. 19.

The foregoing is merely illustrative of the principles of this invention and various modifications can be made by those skilled in the art without departing from the scope and spirit of the invention.

What is claimed is:

1. An electronic device having a periphery, a length, a width, and a height, the electronic device comprising:
   at least one antenna that is formed at least partly from a conductive peripheral housing member that runs along the periphery and has an exterior, and interior, and a gap at the exterior;
   ground structures;
   a first antenna feed connected to the conductive peripheral housing member;
   a second antenna feed connected to the ground structures; and
   a dielectric structure formed on the conductive peripheral housing member that overlaps the gap, wherein the dielectric structure extends parallel to the length and the conductive peripheral housing member has inwardly extending protrusions at the gap that extend from the interior of the conductive peripheral housing member towards an interior of the electronic device.

2. The electronic device defined in claim 1 wherein portions of the exterior of the conductive peripheral housing member form sidewalls for the electronic device.

3. The electronic device defined in claim 1 wherein the dielectric structure has a rectangular shape on the exterior.

4. The electronic device defined in claim 1, wherein the width is less than the length, the height is less than the width, the gap in the conductive peripheral housing member extends across the height, and the dielectric structure extends across the length.

5. The electronic device defined in claim 4, wherein the dielectric structure extends across the width.

6. The electronic device defined in claim 1 wherein the electronic device comprises a rectangular housing with a rectangular periphery, the conductive peripheral housing member comprises a metal ring that surrounds the rectangular periphery, and the dielectric structure runs along an entire length of at least one side of the rectangular periphery.

7. The electronic device defined in claim 6, wherein the dielectric structure runs along four sides of the rectangular periphery.

8. The electronic device defined in claim 6 wherein the dielectric structure comprises a first layer of material that lines the conductive peripheral housing member and a second layer of material that coats the first layer of material, the first and second layers of material being formed from different materials.

9. The electronic device defined in claim 1 wherein the conductive peripheral housing member comprises a plurality of gaps and the dielectric structure overlaps each of the gaps in the plurality of gaps.

10. The electronic device defined in claim 9, wherein the plurality of gaps comprises first and second gaps formed on a first side of the electronic device.

11. The electronic device defined in claim 9, wherein the plurality of gaps comprises first and second gaps formed on respective first and second opposing sides of the electronic device.

12. The electronic device defined in claim 1 further comprising a first dielectric material that bridges the protrusions and a second dielectric material that forms the dielectric structure.

13. The electronic device defined in claim 1 wherein the conductive peripheral housing member has slanted surfaces that form a retention feature that holds the dielectric structure to the conductive peripheral housing member.

14. An electronic device having a length, a width that is less than the length, and a height that is less than the width, the electronic device comprising:
   a radio-frequency transceiver;
   antenna structures coupled to the radio-frequency transceiver;
   a rectangular housing with a rectangular periphery, wherein the rectangular housing comprises a conductive peripheral housing member that runs along the rectangular periphery and has an exterior and an interior, the conductive peripheral housing member comprises at least one dielectric-filled gap at the exterior that extends across the height from a front face to a rear face of the electronic device, and the conductive peripheral housing member forms an antenna resonating element of the antenna structures;
   ground structures;
   a first antenna feed connected to the rectangular housing;
   a second antenna feed connected to the ground structures; and
   a dielectric that is formed over the exterior of the conductive peripheral housing member, that overlaps the gap, and that extends parallel to the length.

15. The electronic device defined in claim 14 wherein the dielectric comprises a plastic ring.

16. The electronic device defined in claim 14 wherein the dielectric extends around substantially all of the rectangular periphery.

17. An electronic device having a length, a width, and a height, the electronic device comprising:
   a rectangular housing having a rectangular periphery;
   a ring-shaped rectangular peripheral housing member that runs along the rectangular periphery and surrounds the rectangular housing, wherein the ring-shaped rectangular peripheral housing member has an interior, an exterior, a gap at the exterior, and a dielectric on the exterior that overlaps the gap and extends parallel to the length;
   an antenna having an antenna resonating element formed from the ring-shaped rectangular peripheral housing member;
   ground structures that are formed within the interior and that are separated from the antenna resonating element by an opening;
   a first antenna feed connected to the ring-shaped rectangular peripheral housing member at a first side of the opening; and
   a second antenna feed connected to the ground structures at a second side of the opening.

18. The electronic device defined in claim 17 wherein the dielectric runs along the rectangular periphery and surrounds the rectangular housing and the ring-shaped rectangular peripheral housing member comprises first and second chamfers that run along the rectangular periphery on opposing sides of the dielectric.

* * * * *